UNITED STATES PATENT OFFICE.

HARLEY J. MORRISON, OF CINCINNATI, OHIO, ASSIGNOR, BY MESNE ASSIGNMENTS, TO THE HYDROGENATION COMPANY, OF CINCINNATI, OHIO, A CORPORATION OF OHIO.

PROCESS FOR THE PRODUCTION OF CATALYTIC MATERIAL AND THE SATURATION OF FATTY ACIDS OR THEIR GLYCERIDS WITH HYDROGEN.

1,299,004.   Specification of Letters Patent.   Patented Apr. 1, 1919.

No Drawing.   Application filed September 11, 1912.   Serial No. 719,761.

*To all whom it may concern:*

Be it known that I, HARLEY J. MORRISON, a citizen of the United States, and a resident of the city of Cincinnati, in the county of Hamilton and State of Ohio, have invented a certain novel and useful Process for the Production of Catalytic Material and the Saturation of Fatty Acids or Their Glycerids with Hydrogen, of which the following is a specification.

It is well known that unsaturated fatty acids, glycerids and other esters may be hydrogenized or converted into corresponding saturated compounds by treatment with hydrogen in the presence of catalytic material. In this treatment, it has been most usual to employ as the catalyzer such finely-divided metals as have been found to possess the required catalytic efficiency, and among other metals, finely-divided nickel has been found the most practical and commercially available metal for this purpose, although in my present invention, I do not wish to confine myself to nickel catalytic material alone. As the efficiency of the catalyzer apparently depends to a large extent on its finely-divided condition, much difficulty has beeen met with in the preparation of an effective and reliable catalyzer adapted for commercial use, and in the preparation, for example, of powdered nickel from nickel salts, much time, labor and care are required.

The usual method for the saturation of fatty acids, their glycerids and other esters is to introduce into a suitable vessel the material to be treated with a small percentage of catalyzer, and then to treat the mass with hydrogen, to convert the material into the desired saturated or partially saturated condition.

I have, however, discovered that the production of the catalytic material from substantially non-catalytic salts or reducible compounds of the base catalytic metals, and the saturation process may be carried on in one operation, and that under proper conditions and treatment in the manner to be hereinafter fully set forth and claimed, the catalyzer may be formed at a much lower temperature than heretofore required and in much less time, and the fatty acids may be saturated or partially saturated in one continuous operation with the preparation of the catalyzer.

I have discovered that carbonates, oxids and hydroxids of the metals from which catalyzers have been heretofore derived, and which carbonates, oxids and hydroxids in themselves have little or no catalytic effect, may be employed, mingled with the unsaturated material in the same manner as catalytic material has been heretofore used, and when treated with hydrogen under the proper conditions of temperature and pressure, the metalliferous material will be reduced and rendered catalytic, and the saturating of the unsaturated material will proceed immediately and continue to any desired point. It is not necessary to use absolutely pure or dry materials. Further any of the soluble salts may be precipitated within the vessel containing the material to be saturated as a carbonate or hydroxid. It is preferable, however, to avoid such salts, the acid portion of which will form a reducible salt with the precipitant, or which salt would act as a " poison."

In carrying out my invention, I introduce the oil into a suitable tank or vessel which may be heated by steam coils, oil bath, or by the direct application of heat, and with the oil I introduce a very small percentage of a metallic carbonate, oxid or hydroxid, the metal of which has catalytic efficiency, but which compound itself has little or no strength as a catalyzer. Hydrogen gas is then passed through the material, which is preferably agitated or stirred up by mechanical agitators to bring the reacting materials into intimate contact, while the hydrogen gas is introduced, the condition of pressure being nonessential.

With the introduction of the hydrogen, the mass is heated from two hundred and fifty (250) degrees C. to two hundred and ninety (290) degrees C. until the desired degree of saturation is obtained. Before introducing the hydrogen, carbonic acid gas, or other inert gas may be introduced into the vessel to drive out any air or other gases and the mass is properly agitated during the treatment with the hydrogen.

The non-catalytic metallic material is preferably, but not necessarily thoroughly dried before it is used, and the effect of the heat and the hydrogen on the material suspended in the oil in finely-divided condition is to reduce it gradually to a metallic state, and as it is reduced the metal acts as a catalyst commencing the hydrogenization of the fatty acid, glycerid or ester immediately.

As an example of the results obtained by this treatment, I take two hundred grams of cottonseed oil in a suitable vessel adapted to be heated and furnished with pipes for the introduction and passage of the hydrogen gas and add thereto one gram of dried nickel carbonate. The material is then agitated and heated to two hundred and fifty to two hundred and seventy degrees C. I then pass a current of hydrogen through the mass and the treatment is continued for two hours. At the end of this time a product is obtained having a melting point of forty-one (41) degrees C., and an iodin value of 51.0. The reaction was still brisk and a much lower iodin value would have been obtained by longer treatment.

*Second example.*

Take two hundred grams cottonseed oil with one gram nickel hydroxid. Treatment with hydrogen for one and three quarters of an hour at a temperature of two hundred and fifty (250) degrees C., to two hundred and seventy (270) degrees C. gave product melting at 36.1° C. with iodin value of 66.75. The absorption of hydrogen at the end of this time was as brisk as at any time, and a longer treatment would have completed the saturation.

*Third example.*

The same treatment of cottonseed oil with three per cent. of copper hydroxid for two hours produced a fat with melting point of thirty-eight (38) degrees C. and an iodin value of 66.

Similar results were obtained by thoroughly mixing with the oil wet freshly-precipitated carbonates or hydroxids; also the basic carbonate precipitated from a solution of nickel chlorid by sodium carbonate.

Under my process the nickel carbonate or hydroxid is reduced to a metallic state and it is highly magnetic.

By filtering out the metal, an effective catalyzer is obtained, suitable for subsequent operations at the ordinary low temperatures usually employed for saturation.

As a new method of producing a catalyzer my discovery is of great importance.

For the reduction of a nickel salt to the finely-divided metallic state for a catalyzer under the ordinary processes, the temperature is usually six hundred to seven hundred degrees C., and the time required covers many hours.

In my present process, the oil appears to act as a mechanical separator or supporter, holding the metal as formed in suspension and in finely-divided form.

Where the production of a catalyzer alone is desired, a saturated or inert oil, such as a paraffin hydrocarbon, may be used as the support, which oil will not under any circumstances absorb hydrogen. Under these conditions, the mineral oil acts as the support and the catalytic metal is produced, but there is no absorption of the gas during the chemical reaction.

I claim:

1. The method of preparing a metal catalyzer and hydrogenizing fatty acids and their esters in one operation, which consists in agitating a heated mixture of the material to be hydrogenized and a substantially non-catalytic compound of a catalytic metal, the process being conducted in an atmosphere containing hydrogen and at a temperature substantially from two hundred and fifty degrees centigrade to two hundred and ninety degrees centigrade, said compound reducible under the conditions of the process.

2. The method of preparing a metal catalyzer, which consists in agitating a heated mixture of oil and a substantially non-catalytic compound of a catalytic metal in contact with a gaseous reducing agent, the process being conducted at a temperature substantially from two hundred and fifty degrees centigrade to two hundred and ninety degrees centigrade, said compound reducible under the conditions of the process.

3. The method of preparing a catalyzer and hydrogenizing fatty acids and their esters in one operation, which consists in treating the heated material to be hydrogenized with hydrogen in the presence of a substantially non-catalytic compound of a catalytic metal, the process being conducted at a temperature substantially from two hundred and fifty degrees to two hundred and ninety degrees centigrade, said compound reducible under the conditions of the process.

4. The method of preparing a catalyzer, which consists in subjecting a heated mixture of oil and a substantially non-catalytic compound of a catalytic metal to the action of a gaseous reducing agent at temperature substantially from two hundred and fifty degrees centigrade to two hundred and ninety degrees centigrade, said compound reducible under the conditions of the process.

5. The method of preparing a catalyzer, which consists in subjecting a heated mixture of oil and a substantially non-catalytic reducible nickel compound to the action of a gaseous reducing agent at a temperature substantially from two hundred and fifty degrees centigrade to two hundred and ninety degrees centigrade.

HARLEY J. MORRISON.

Attest:
THOMAS BENTHAM,
ANNA F. DIENST.